No. 842,450. PATENTED JAN. 29, 1907.
M. ENNIS.
BOLT.
APPLICATION FILED NOV. 17, 1906.
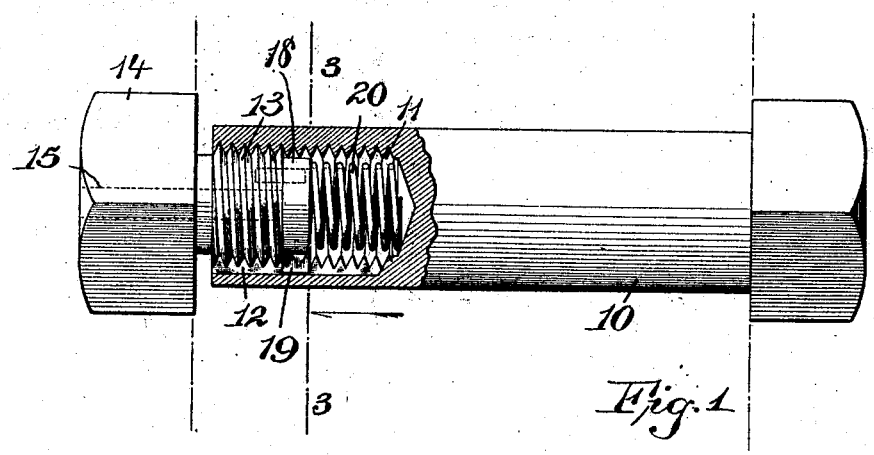
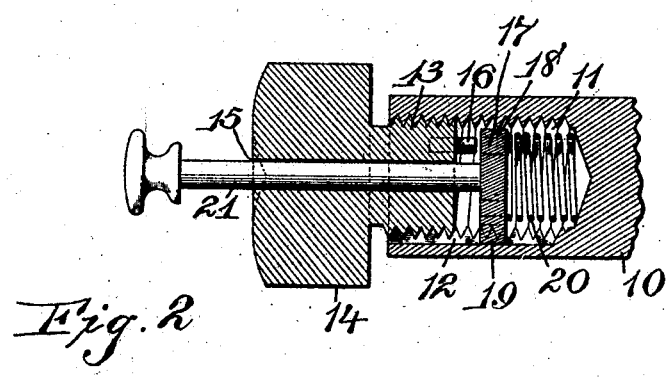
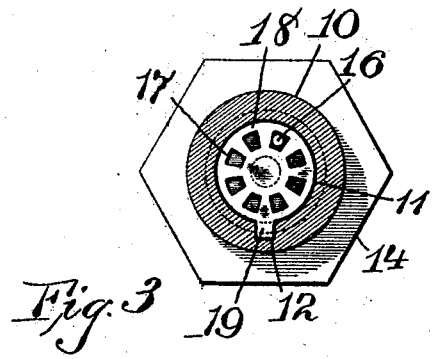
WITNESSES:
E. A. Pell
Ralph Lancaster
INVENTOR
Michael Ennis
BY
Wm. H. Canfield.
ATTORNEY

UNITED STATES PATENT OFFICE.

MICHAEL ENNIS, OF NEWARK, NEW JERSEY.

BOLT.

No. 842,450.

Specification of Letters Patent.

Patented Jan. 29, 1907.

Application filed November 17, 1906. Serial No. 343,854.

*To all whom it may concern:*

Be it known that I, MICHAEL ENNIS, a citizen of the United States, residing at Newark, in the county of Essex and State of New Jersey, have invented certain new and useful Improvements in Bolts; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a lock for bolts, and is designed to hold a bolt against extraction from the recess in which it is insertep without manually manipulating through the bolt a locking-disk which is spring-actuated to normally lock the bolt in position.

This device is applicable to different purposes and can be used on the ends of axles or in machine elements where it is necessary to insure the fastening of a bolt, and it also provides a construction that is simple to operate.

The invention is illustrated in the accompanying drawings, in which—

Figure 1 is a view of the lock as applied to a bolt inserted into the end of a member, which is in this case illustrated as a second bolt. Fig. 2 is a vertical section of the same, and Fig. 3 is a section on line 3 3 in Fig. 1.

The member 10, in the illustration shown as a bolt, is the member that is adapted to receive the bolt to be locked and is provided with a screw-threaded recess 11, longitudinally of which is arranged a slot 12. Into this recess is screwed the bolt to be locked, which consists of the screw-threaded shank 13 and a head 14, the shank and the head being provided with a longitudinal opening 15, which is preferably central. Eccentrically mounted on the end of the shank 13 is a pin 16, and when the bolt is turned this pin 16 revolves around, coming successively in register with the opening 17 in the locking-plate 18, this locking-plate being held against rotation by a tongue 19, fitting in the slot 12. The locking-plate is forced toward the entrance of the recess 11 by the spring 20.

It will be seen that when the bolt 13 is to be inserted in the screw-threaded recess 11 the head 14 is turned, and at the same time a pin 21 is inserted through the opening 15. The pin of course being longer than the bolt is pressed against the locking-plate at the same time that the bolt is turned and keeps the locking-plate 18 out of engagement with the screw-threaded shank 13. When the plate is to be locked, however, the pin 21 is withdrawn and the pin 16 enters one of the openings or perforations 17, and the bolt is locked against rotation. If, however, the pin 16 is not in register with one of the openings 17, a small movement in one direction or the other of the screw-threaded shank 13 will cause the pin 16 to enter one of the perforations 17 and be locked against rotation in either direction.

When the elements are to be taken apart, the pin 21 is again inserted, the lock-plate 18 is slid back out of engagement with the pin 16, and while the pin 21 is thus held in engagement with the plate 18 the bolt can be turned to withdraw the shank 13 from the recess 11. This provides a safe locking means, is easily operated, and insures against accidental separation of the parts.

Having thus described my invention, what I claim is—

1. In a bolt-lock, the combination with a member having a screw-threaded recess, the recess having a longitudinal slot therein, of a bolt having a screw-threaded shank, the bolt having a central perforation, a pin eccentrically mounted on the end of the bolt, a locking-plate arranged to slide in the recess and having a tongue to fit in the groove, the locking-plate having a series of perforations concentrically arranged therein and adapted to come in line with the pin on the bolt, and a spring between the locking-plate and the end of the recess in the first member.

2. A locking means for a bolt comprising a member having a screw-threaded recess, the recess having a longitudinal groove, a bolt having a screw-threaded shank to fit in the recess, the bolt having a longitudinal perforation, and a pin mounted eccentrically in the end of the bolt, a lock-plate sliding in the recess having a tongue to fit in the groove, perforations in the locking-plate to engage the pin on the bolt, means for normally holding the locking-plate in engagement with the bolt, and manually-operated means for disengaging the lock-plate from the bolt.

In testimony that I claim the foregoing I have hereunto set my hand this 15th day of November, 1906.

MICHAEL ENNIS.

Witnesses:
WM. H. CAMFIELD,
E. A. PELL.